[11] 3,546,440

[72] Inventor Kenneth J. Fawcett, Jr.
     Falls Church, Virginia
[21] Appl. No. 731,872
[22] Filed May 24, 1968
[45] Patented Dec. 8, 1970
[73] Assignee Scope, Incorporated
     Reston, Virginia
     a corporation of New Hampshire

[54] SPECTRUM ANALYZER WHEREIN AN ANALOG WAVEFORM IS SAMPLED EXPONENTIALLY IN TIME WITH TWO FIXED REFERENCE SEQUENCES
     6 Claims, 3 Drawing Figs.

[52] U.S. Cl. .......................................... 235/150.5,
                            235/181, 235/92, 324/77
[51] Int. Cl. ............................................. G06j 1/00,
                                                    G06f 15/34
[50] Field of Search ............................. 235/197,
     193, 150.5, 150.51, 150.52, 150.53, 92—50,
     92—57, 132, 181; 307/229, 230, 271, 220;
     328/34, 48, 63; 324/77B, 77G-V

[56]            References Cited
            UNITED STATES PATENTS
3,050,708  8/1962  Van Alstyne et al. .......... 328/48X
3,062,442  11/1962 Boensel et al. ................ 235/92(50)UX
3,142,802  7/1964  Maure .......................... 328/63UX
3,208,065  9/1965  Gutleber et al. .............. 324/77(H)UX
3,212,092  10/1965 Anderson et al. ............. 235/181X
3,238,462  3/1966  Ballard et al. ................ 328/63
3,270,315  8/1966  Parks ........................... 324/77(H)UX
3,290,590  12/1966 Baker ........................... 324/77(H)UX
3,320,411  5/1967  Martinez ...................... 235/193X
3,377,544  4/1968  Dickerson ..................... 307/229X
3,424,986  1/1969  Vasseur ........................ 235/92(57)UX

*Primary Examiner*—Malcom A. Morrison
*Assistant Examiner*—Joseph F. Ruggiero
*Attorney*—John E. Benoit ABSTRACT: A system is disclosed for deriving a constant percentage power spectrum of an analog waveform by performing a sliding cross correlation of the digital sequence obtained by sampling the analog waveform exponentially in time with each of two fixed reference sequences, and summing the squares of the two correlation products. Additionally, there is disclosed a means for generating an exponential pulse train using a digital counter of specified modulus, a slow binary counter and a fast binary counter.

SPECTRUM ANALYZER WHEREIN AN ANALOG WAVEFORM IS SAMPLED EXPONENTIALLY IN TIME WITH TWO FIXED REFERENCE SEQUENCES

The present invention relates generally to a spectrum analyzer, and more specifically to a real-time digital spectrum analyzer with constant-percentage analysis bandwidth and frequency resolution.

An object of the invention is to perform a constant percentage spectrum analysis by a sliding cross correlation of a digital sequence obtained by sampling the analogue waveform exponentially in time with two fixed reference sequences, and summing the squares of the two correlation products.

The present invention will be understood from the following description when taken in conjunction with the drawings wherein.

Figure 1:
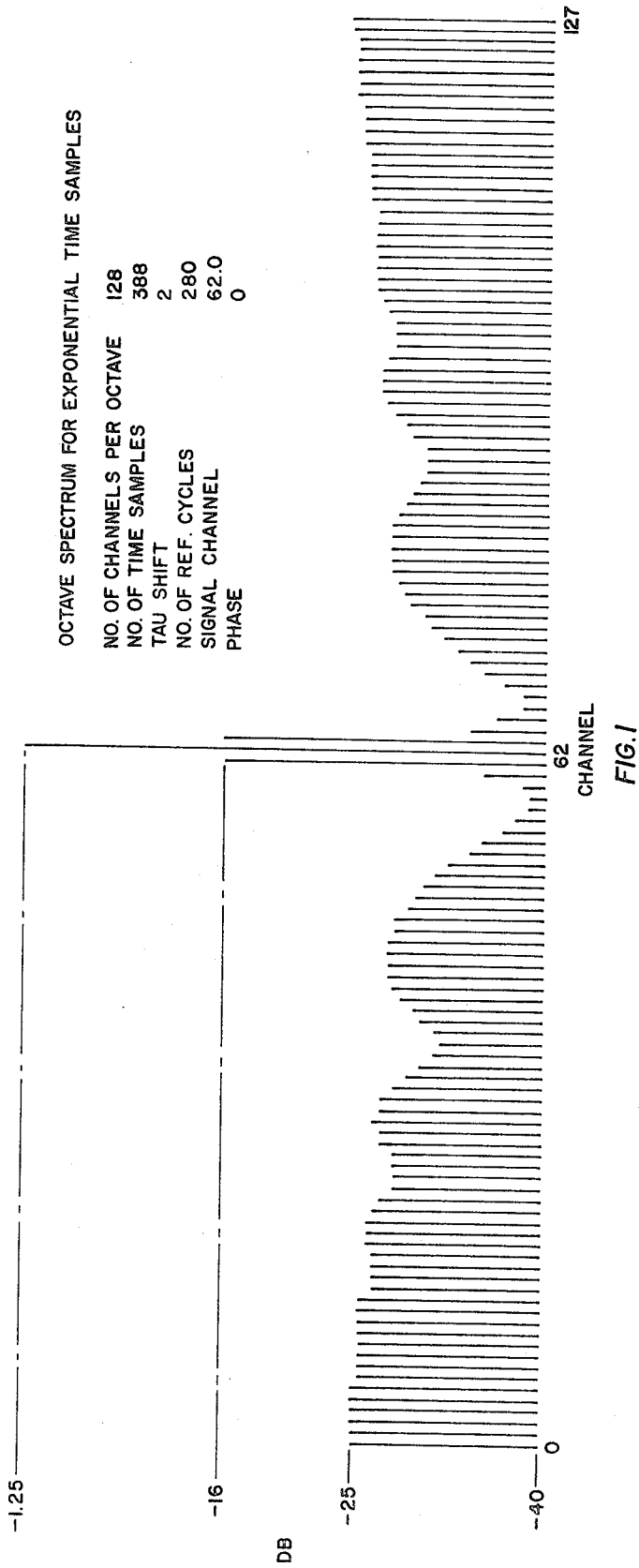
FIG. 1 is a graphic illustration of a typical response curve of the present invention.

The present invention relates to a spectrum analysis technique based upon a concept which represents an unorthodox approach to digital spectral analysis. Specifically, this invention incorporates a technique which uses a data record derived from exponentially time-spaced samples of a continuous time waveform, whereas conventional practice is to use equally-spaced records.

As a matter of background information, it would be well to consider the process and problems involved in constant percentage spectrum analysis with equispaced records. In such a procedure, as with the present invention it is convenient to prefilter and channelize the input-time waveform on an octave-by-octave basis. To provide alias protection, the waveform sampling rate must conform to the Nyquist criterion and be at least twice the highest frequency $f_{max}$ in the (prefiltered) environment. For a given protection against aliases, the minimum allowable sampling rate would be twice the frequency of the reciprocal response point on the upper skirt of the octave band-pass filter. Hence:

$$f_{samp} > 2f_{max}; \quad (e.g., f_{samp} = 3f_{max}) \quad (1)$$

The analysis channel bandwidth on the other hand is inversely proportional to the time length of the data record. To achieve constant-percentage bandwidths requires an inverse constant-percentage record-time length. This may be implemented (approximately) by successively decreasing the number of data samples to be used for the higher-frequency, greater-bandwidth analysis channels.

The maximum number of data samples generated per data cycle would be for the analysis of the lowest frequency, $f_{min}$, channel within each octave. This number can be closely estimated for a given set of requirements. Assume that a 3 db. bandwidth required for a particular application is .05 percent (i.e., approximately $1 - 2^{1/128}$) and that 128 analysis channels per octave are required; hence, the minimum bandwidth is $f_{min}/200$. To achieve a reasonably low response to out-of-band signals displaced by one or more channels from the center frequency requires the weighting of data samples by a lag window. The purpose of this window is to suppress the $\sin^2 x/x^2$ sidelobes of unweighted data.

Another effect of weighting, however, is to broaden the filter response. The assumption of the much-used "hanning" window would be adequate for purposes of the present discussion. The hanning filter has a 3 db. bandwidth which is given approximately by $1.4/T$, where T is the time length of the data stream. Hence:

$$\frac{f_{min}}{200} = \frac{f_{max}}{(2)(200)} = \frac{1.4}{T} \quad (2)$$

Finally, equate the number, $n$, of data samples to the data length:

$$T = \frac{n}{f_{samp}} \quad (3)$$

Combining equations (1), (2), and (3) and solving for $n$:

$$n = (2)(3)(200)(1.4) = 1680 \text{ samples} \quad (4)$$

The number of data samples used would diminish exponentially to $n/2$ at $f_{max}$. One would like to consider one or another of the existing fast Fourier transforms for the processing of this data. Unfortunately, these transforms are applicable only for evenly-spaced frequency channels. Therefore, the conventional digital spectrum analysis process would entail the generation of different sine and cosine demodulation waveforms for each of the 128 analysis channels, the generation of a (different length) lag window for each frequency, and the sample-by-sample multiplication of data, window and trigonometric reference functions. When the accumulated sums are squared, combined, then normalized in accordance with the varying number of samples, they yield power values in full conformity to the assumed requirement.

As previously stated, the spectrum-analysis technique herein disclosed entails the exponential time sampling of the analogue waveform after octave band-pass filtering. Assume that the sample interval is an exponentially increasing function (although the time-mirrored decreasing function is equally applicable) and that each sampling interval is defined as $t_0$ times successive powers of the constant $\alpha$. It will further be stipulated for discussion purposes that successive frequency channels differ from each other by the 128th root of 2 so as to yield 128 constant-percentage channels per octave. Specifically, then, $\alpha$ must be a root of 2, which is an integral multiple, $r$, of 128:

$$\alpha = 2^{1/128r} \quad (5)$$

and successive time intervals are given by:

$$t_0, \ 2^{1/128r}t_0, \ 2^{1/128r}t_0, \ \ldots \ 2^{i/128r}t_0 \quad (6)$$

where $t_0$ is a variable system constant.

In constant-percentage analysis, a constant number of samples, $n$, are used to perform each frequency channel analysis. The first $n$ successive data samples are used to determine the $f_{max}$ power value. Again, sine and cosine demodulation functions will be employed in conjunction with a lag window, $W(t)$. Values of $W(t)\sin(2\pi f_{max} t)$ and $W(t)\cos(2\pi f_{max} t)$ are computed and stored for each of the first $n$ values of $t$ given by the exponential sampling function. These computations may be performed beforehand and the $n$ values of each waveform stored in the equipment as permanent reference functions.

In this case, $W(t)$ is the product of two independent windows. The first is an exponentially tapered window which takes the value of successive powers of $\alpha$ for each successive sample. Its effect is to normalize the time density of each sample in the Fourier transform. Applied alone, this window yields a $\sin^2 x/x^2$ filter response. The second window is used to shape the filter response just as for equispaced analysis, and the "hanning" window again offers satisfactory properties.

To determine $f_{max}$ power response, the first $n$ data samples are demodulated by (correlated with) the two $n$-valued reference functions and the two demodulation products are added in quadrature; i.e., the correlation values are squared and summed.

To determine the power response of the next-to-highest frequency channel, $f_{max}-1$, the first $r$ data samples are ignored and the next $n$ data samples are demodulated by the same reference waveforms. In effect, the present invention accomplishes spectral analysis by a sliding cross correlation of the data train with the two stored reference patterns, there being a shift of $r$ samples between each correlation computation. That this process yields constant-percentage center-frequencies and bandwidths is readily demonstrated.

Consider any $i^{th}$ time interval, $t_i$, of the data sequence used in the computation of power at $f_j$:

$$t_i = 2^{i/128r}t_0; \ f_j \quad (7)$$

This interval will correspond to a particular time interval of the reference waveform, and the phase angle difference, $\Delta \Phi r$, between the two reference samples defining this interval will be:

$$\Delta \phi_r = (2\pi f_j)(t_i) \qquad (8)$$

There appears below a summarization of the salient features of the constant-percentage spectrum-analysis technique of the present invention as compared with the known digital technique using equispaced records.

| Requirements | Constant-percentage spectrum-analyzer (Exponential record) | Digital filters (Equispaced record) |
| --- | --- | --- |
| Number of data samples | 642 | 1,680. |
| Data samples per channel analysis | 388 | Variable, 840 to 1,680; Mean: 1,212. |
| Multiplications per octave analysis (Reference and window). | 2×128×388=99k | 3×128×1,212=465k. |
| Function generation requirements | (1) exponential sampling generator (642 values) (1) sin ref (388 values) (1) cos ref (388 values). | (128) sin and cos functions (840 to 1,680 values each) (128) lag window functions (840 to 1,680 values). |
| Process program | 1 fixed program | 128 variable length programs. |

For the computation of power at $f_{j-1}$, the time interval of the data corresponding to the same reference time interval is given by:

$$t_{i+r} = 2^{i+r/128r} t_0 = 2^{1/128r} t_i; \; f_{j-1} \qquad (9)$$

The particular phase angle, $\Delta \Phi \Phi r$, is, of course, a constant and we can equate:

$$(2\pi f_j)(t_i) = (2\pi f_{j-1})(2^{1/128}t_i)$$
$$f_j = 2^{1/128} f_{j-1} \qquad (10)$$

Equation (10) shows that the frequency channels are indeed separated by 1/128th of an octave and that the indentical sine and cosine reference functions would be computed regardless of the choice of frequency.

The reference data samples will cover a phase span of $m$ cycles of the demodulating waveforms ($m$ need not be an integer). Therefore, the frequency analysis bandwidth will be a constant percentage of the center frequency. For the hanning window, the 3 db. bandwidth is given by equation (2); since this bandwidth is desired to be 1/200th of the center frequency:

$$\frac{1.4}{T_j} = \frac{f_j}{200}; \; T_j = \frac{m}{f_j}$$
$$m = 200 \times 1.4 = 280 \text{ cycles} \qquad (11)$$

Having evaluated $m$, the next requirement is to evaluate $n$, $r$, and $t0$. These system constants are dependent variables with two degrees of freedom, with $t0$ specified as the dependent variable. The evaluation of $n$ and $r$ affects the out-of-channel frequency response of the digital filters much as the selection of a periodic sampling frequency affects the alias pattern. However, very reasonable performance characteristics are obtained (i.e., all out-of-channel frequency responses greater than 20 db. below the in-channel response) with an average sampling rate which is considerably sub-Nyquist inasmuch as the spectra of the exponential sampling pulses do not generate the strong frequency lines which produce aliases.

Computer simulations of the system have been performed allowing $n$ and $r$ to be variables. The system input consisted of computer generated samples of a sinusoidal waveform of arbitrary frequency and relative phase. As would be expected, a change of signal frequency results only in a translation of the response curve as shown in FIG. 1 (i.e., the response of each filter channel is completely identical with respect to a percentage change of frequency). A change of response with respect to relative phase angle can be observed only at the low-level, off-frequency locations where such a change is immaterial. The response level differential and the effective frequency range of operation over which a given differential occurs can both be increased by increasing the value of $n$ and/or $r$. A typical response curve is shown in FIG. 1 with a computer simulated sine wave input at channel 62. This response curve shows that an $n$ of 388 and an $r$ of 2 are entirely adequate to meet the assumed system performance requirements. Using these evaluations, the total number of samples, $n'$, required for analysis is given by:

$$n' = n + 127r = 388 + 254 = 642 \qquad (12)$$

Figure 2:
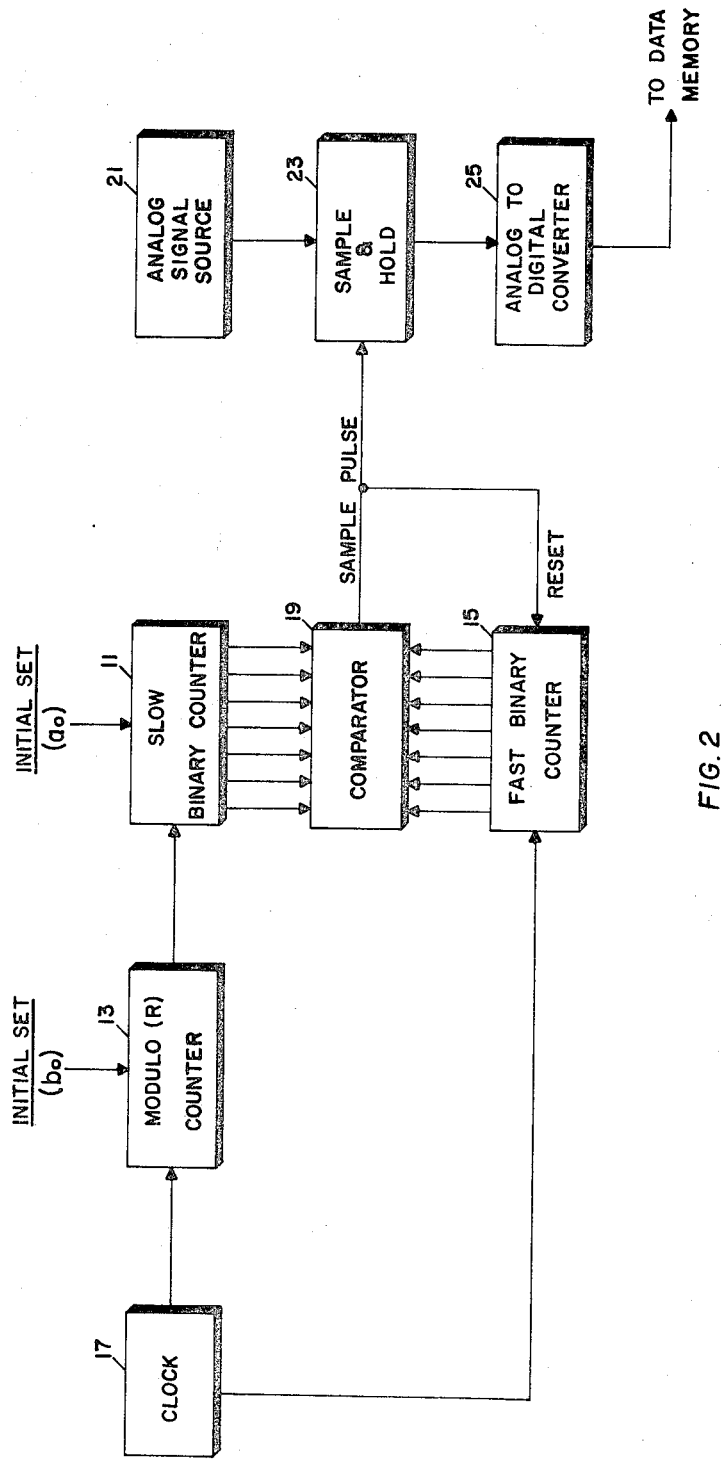
FIG. 2 is a schematic illustration diagram for generating an exponential pulse train for sampling an analogue signal source.

Implementation of the device of the present invention may be accomplished as discussed below. One method of generating the exponential pulse train is shown in FIG. 2. At the generation of the first sample pulse, the initial values $a0$ and $b0$ are set into the slow binary counter 11 and the modulo (R) counter 13 as shown, and the fast binary counter 15 is reset to zero. The values $a0$ and $b0$ are arbitrary within limits since they determine the total number of clock cycles within an octave for a particular fixed clock speed. The clock 17 input into the generator is used to count up the fast binary counter and the modulo (R) counter. When the modulo (R) counter overflows (reaches a count of R), it increments the count in the slow binary counter and is reset to zero. When the count in fast binary counter 15 matches that in slow counter 11 as determined by the comparator 19, a sample pulse is generated and a fast binary counter 15 is reset to zero. Therefore, the time interval between the first and second sample pulses, as quantized in clock cycles, will either be $(a0)t_{clock}$ or $(a0+1)t_{clock}$ if the slow binary counter happened to have been incremented during this time interval. As slow binary counter 11 is successively incremented, the time between pulses is successively increased in a manner which is shown below to be exponential.

Assume that the contents of slow binary counter 11 and modulo R counter 13 at the time of a given pulse occurrence to be designated $a$ and $b$ respectively. That discrete time interval between pulses, $\Delta t_i$, which has just concluded will be $a$ clock cycles. The best continuous-valued approximation of this interval is given by:

$$\Delta t_i = \left(a + \frac{b}{R} - \frac{1}{2}\right) \Delta t_{clock} = \left(a \pm \frac{1}{2}\right) \Delta t_{clock} \qquad (13)$$

The preceding time interval $\Delta t_{(i-1)}$—was concluded exactly $a$ clock cycles previously and hence its best approximation is:

$$\Delta t_{(i-1)} = \left(a + \frac{b}{R} - \frac{a}{R} - \frac{1}{2}\right) \Delta t_{clock}$$
$$= \left[\left(a \pm \frac{1}{2}\right) - \frac{a}{R}\right] \Delta t_{clock} \qquad (14)$$

The best approximation of the ratio of these two intervals is given by:

$$\frac{\Delta t_i}{\Delta t_{(i-1)}} = \frac{a}{a - \frac{a}{R}} = 1 + \frac{1}{R-1} \qquad (15)$$

Equations (5) and (15) can be equated to give:

$$R = 1 + \frac{1}{(2^{1/128r} - 1)} \qquad (16)$$

A computer simulation of the exponential pulse-train generator compared pulse-by-pulse with the actual desired values over an octave range of pulse intervals was performed with the following results. For the simulation, $r$ was chosen as 2 wherein R evaluates to 369.83. The summation below shows some of the results of this simulation which has not been carried to the point of optimization.

| R | $a_0$ | $b_0$ | Clock cycles per octave | Maximum error in pulse position in— | |
|---|---|---|---|---|---|
| | | | | Clock cycles | Degrees of phase * |
| 369 | 128 | 0 | 47,196 | −11.76 | −13.6 |
| 370 | 128 | 0 | 47,143 | +4.13 | +4.8 |
| 369¾ | 128 | 0 | 47,157 | −2.31 | −2.7 |
| 369¹³⁄₁₆ | 128 | 0 | 47,156 | −2.60 | −3.0 |
| 370 | 128 | 185 | 47,330 | +4.27 | +4.9 |
| 369¾ | 64 | 0 | 23,492 | +1.71 | +4.0 |
| 396¾ | 32 | 0 | 11,653 | −1.41 | −6.6 |

*For the parameters chosen in Fig. 1 one octave of pulse interval is equated to reference phase as follows:

$$\frac{\text{degrees}}{\text{octave}} = \frac{280 \times 360}{2^{388/256} - 1} = 54,500 \qquad (17)$$

The results of the exponential pulse generator simulation suggest the need for a system clock whose frequency is only about 2 orders of magnitude higher than the highest frequency to be analyzed.

The sample pulse generated as shown in FIG. 2 causes the instantaneous amplitude level of the analogue signal source 21 to be held as a voltage level by a conventional sample and hold circuit 23. This voltage level is converted into a binary code by a conventional analog to digital converter 25. This binary output is stored in any form of digital memory as convenient to subsequent processing.

Figure 3:
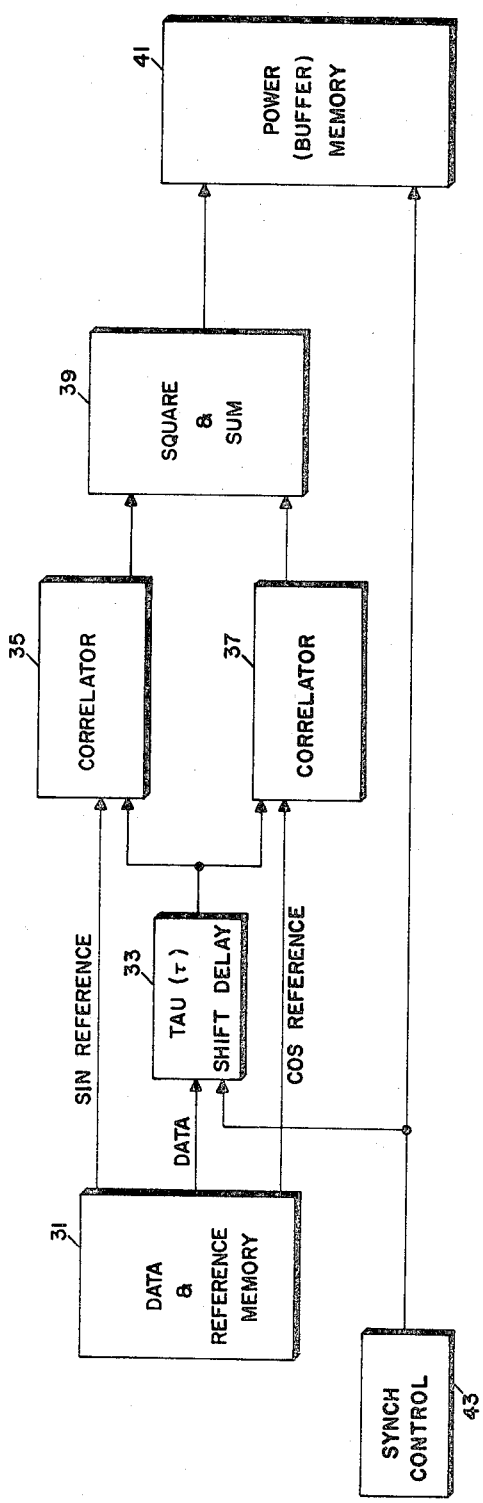
FIG. 3 is a schematic illustration of one form of the basic concept of the present invention.

FIG. 3 illustrates the functional form of the analysis process of the present invention employing two predetermined digital reference sequences and the stored data sequence.

The data from memory device 31 is supplied through tau-shift delay 33 to correlators 35 and 37. Additionally, a sine reference sequence is supplied to correlator 35 and a cosine reference sequence is supplied to correlator 37. The output product of the two correlators are summed and squared in device 39, and the output therefrom is buffered into memory 41. A synch control is coupled to the tau-shift delay 33 and the memory 41 to assure proper synchronization of the overall system. Since the digital data replica will be used over and over and in sequence, an easily implemented recirculating serial memory can be used.

It is to be understood that the above description and accompanying drawings are illustrative only since various pieces of specific equipment may be used to accomplish the required functional results. Further, it should be recognized that the specific mathematical numbers used are only for purposes of clarifying the invention. Accordingly, this invention is to be limited only by the scope of the following claims.

I claim:
1. A device for deriving a constant percentage spectrum analysis of an analog wave form input comprising:
   exponential pulse train generator means coupled to said analog waveform input;
   two fixed reference storage means;
   correlation means coupled to the output of said exponential pulse train generator means and said fixed reference storage means; and
   means for analyzing the output of said correlation means.

2. The device of claim 1 wherein said correlation means comprises two cross-correlators, and a tau-shift delay coupled to said cross correlators.

3. The device of claim 1 wherein said exponential pulse train generator means comprises:
   a modulo counter set at a predetermined initial value;
   a slow binary counter set at a predetermined initial value and coupled to the output of said modulo counter;
   a fast binary counter;
   a clock input coupled to the input of said modulo counter and said fast binary counter;
   a comparator coupled to the outputs of said slow binary counter and said fast binary counter for supplying a sample pulse output; and
   coupling means between the output of said comparator and said fast binary counter for resetting said fast binary counter.

4. The device of claim 1 wherein said correlation means comprises:
   a first correlator coupled to said first fixed reference storage means;
   a second correlator coupled to said second fixed reference storage means;
   a tau-shift delay coupled between the output of said exponential pulse train generator and said first and second correlators; and
   a summer and squarer coupled between the output of said correlators and said analyzing means.

5. An exponential pulse generator comprising:
   a counter set at a predetermined modulus;
   a slow binary counter set at a predetermined initial value and coupled to the output of said predetermined modulo counter;
   a fast binary counter;
   a clock input coupled to the input of said modulo counter and said fast binary counter;
   a comparator coupled to the outputs of said slow binary counter and said fast binary counter for supplying a sample pulse output; and
   coupling means between the output of said comparator and said fast binary counter for resetting said fast binary counter.

6. A method for deriving a constant percentage spectrum analysis of an analog wave form which comprises:
   generating an exponential pulse train from said analog wave form;
   generating two fixed frequency outputs;
   correlating the exponential pulse train and said fixed reference outputs; and
   analyzing the output derived as a result of said correlation.